C. F. ORVIS.
Fishing-Reels.
No. 150,883. Patented May 12, 1874.
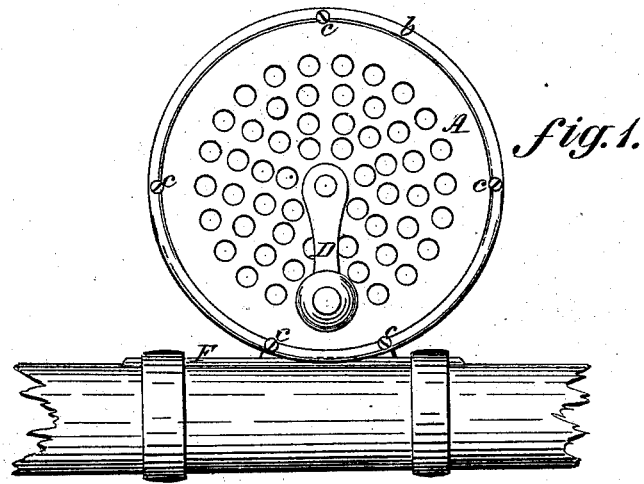
*fig. 1.*
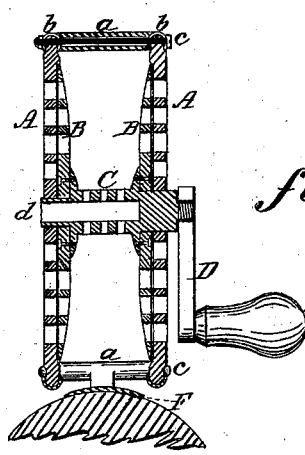
*fig. 2.*
*fig. 3.*
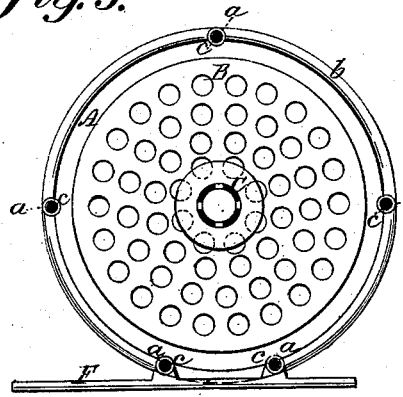
Attest:
J. H. Rutherford,
R. H. Whitesey
Inventor:
Charles F. Orvis,
by Johnson & Johnson
his Attorneys

United States Patent Office.

CHARLES F. ORVIS, OF MANCHESTER, VERMONT.

IMPROVEMENT IN FISHING-REELS.

Specification forming part of Letters Patent No. 150,883, dated May 12, 1874; application filed April 4, 1874.

*To all whom it may concern:*

Be it known that I, CHARLES F. ORVIS, of Manchester, in the county of Bennington in the State of Vermont, have invented certain new and useful Improvements in Reels for Fishing-Lines, of which the following is a specification:

My invention relates to devices for winding up the line of a fishing-rod; and my said invention consists, first, in the combination, in a fishing-line reel, of perforated fixed outside plates or disks, and perforated revolving inside plates or disks, for the purpose of thoroughly drying and ventilating the reel, and thereby preventing the decay of the line; second, of a hollow perforated winding open shaft, in combination with the inner and outer perforated disks, whereby the ventilation and drying of the line are effected through the hub, as well as the inclosing sides; third, of hollow metallic embracing-bands, in combination with the outside perforated hard-rubber plates or disks, for the purpose of strengthening and protecting said rubber plates, and forming, in connection with the reel-bar, the reel-frame.

In the accompanying drawings, Figure 1 represents a view in elevation of my improved reel; Fig. 2, a cross-sectional view; and Fig. 3 a section taken at right angles to Fig. 2.

The reel is composed of four concentric perforated rubber disks, placed in pairs at a suitable distance each from the other, the outside disks A of each pair being fixed, and mounted in a frame, *a b c*, which will be presently described, while the inner disks, B, of a less diameter, are suitably secured to and revolve with a hollow perforated metallic shaft, C, which is operated by a winding crank, D, and has its bearings in the outer fixed disks, which are connected by short connecting-rods *a*, which also serve as guards in winding up the line.

The frame *a b c* consists of hollow metallic bands *b*, which embrace the edges of the outer fixed perforated disks, for the purpose of protecting and strengthening the same, and which are connected by hollow connecting-rods *a*, through which pass pin-bolts *c*, two of said rods *a* being secured to the metallic reel-bar F, which, when the reel is in use, is fastened to the fishing-rod.

The fishing-line is passed through one of the perforations in the hollow open shaft C, and then knotted, and by this means a perfect and uniform winding of the line upon the spool is effected.

In winding up the wet line, the water escapes through the perforations in the disks and in the hollow shaft, out through its open end *d*, and when wound up the air is admitted to the line both from the outside (through the disk perforations) and from the inside, (through the open shaft perforations,) and a current of air is continually forcing itself through the wound-up line, and all mildew and rot thereby avoided, as under these circumstances the line soon becomes thoroughly dried.

I have described above a reel in which the perforated disks are made of hard rubber; but do not wish to be confined to this material, as the reel may be made of metal throughout, and its construction would then be the same, except that the two outer disks are necessarily without any strengthening-bands, and form of themselves, in connection with the reel-bar, the frame of the reel.

The whole device, when not in use, is usually incased in a suitable and convenient box which can be carried in the pocket.

The hollow perforated hub may be open at one or both ends, as may be deemed best.

I claim—

1. The combination, in a reel for fish-lines, of the perforated fixed outside disk with the revolving inside perforated disks, as described, and for the purposes set forth.

2. The hollow perforated winding-shaft, in combination with the perforated inside and outside disks, as and for the purpose described.

3. The hollow metallic embracing-bands, in combination with the outside rubber disks, as and for the purpose described.

CHARLES F. ORVIS.

Witnesses:
    FRANKLIN H. ORVIS,
    E. B. BENTON.